(12) United States Patent
Stobart

(10) Patent No.: US 7,108,285 B2
(45) Date of Patent: Sep. 19, 2006

(54) ROAD AND RAIL TANKERS

(76) Inventor: Allan William Stobart, Low Currig, Raughton Head, Dalston, Carlisle, Cumbria CA5 7DX (GB)

( * ) Notice: Subject to any disclaimer, the term of this patent is extended or adjusted under 35 U.S.C. 154(b) by 0 days.

(21) Appl. No.: 10/839,531

(22) Filed: May 4, 2004

(65) Prior Publication Data

US 2004/0207192 A1    Oct. 21, 2004

Related U.S. Application Data

(63) Continuation of application No. 10/390,285, filed on Mar. 17, 2003, now Pat. No. 6,793,250, which is a continuation of application No. 09/699,720, filed on Oct. 30, 2000, now Pat. No. 6,557,896.

(30) Foreign Application Priority Data

| Nov. 2, 1999 | (GB) | ................................... 9925791.7 |
| Jan. 15, 2000 | (GB) | ................................... 0000857.3 |
| Apr. 20, 2000 | (GB) | ................................... 0009702.2 |
| Sep. 12, 2000 | (GB) | ................................... 0022239.8 |

(51) Int. Cl.
*B60P 3/22* (2006.01)

(52) U.S. Cl. ................... 280/838; 280/839; 105/358; 220/562

(58) Field of Classification Search ............. None
See application file for complete search history.

(56) References Cited

U.S. PATENT DOCUMENTS

| 1,280,210 | A | * | 10/1918 | Golding ................... 410/68 |
| 1,509,121 | A | | 9/1924 | Willoughby ............... 410/68 |
| 1,583,556 | A | | 5/1926 | Jensen .................... 280/838 |
| 1,656,427 | A | | 1/1928 | Davis, Jr. ................. 220/564 |
| 1,727,609 | A | | 9/1929 | Kramer ................... 410/68 |
| 1,774,086 | A | | 8/1930 | Davis, Jr. ................. 280/838 |
| 1,844,530 | A | | 2/1932 | Thwaits .................. 280/838 |
| 1,915,757 | A | | 6/1933 | Pierce .................... 414/526 |
| 2,008,858 | A | | 7/1935 | French et al. ............. 280/838 |
| 2,097,113 | A | | 10/1937 | Bradley .................. 280/837 |
| 2,114,822 | A | | 4/1938 | Thwaits .................. 280/838 |
| 2,122,574 | A | | 7/1938 | Kuss ..................... 280/838 |
| 2,239,507 | A | | 4/1941 | Pierce .................... 280/838 |
| 2,696,738 | A | * | 12/1954 | Lupfer .................... 73/299 |
| 2,732,715 | A | * | 1/1956 | Hawkins ................. 73/323 |

(Continued)

FOREIGN PATENT DOCUMENTS

DE    3308834    9/1984

(Continued)

*Primary Examiner*—Christopher P. Ellis
*Assistant Examiner*—Christopher Bottorff
(74) *Attorney, Agent, or Firm*—Drinker Biddle&Retah LLP

(57) ABSTRACT

A tanker trailer includes tanks mounted one behind the other to a chassis using a flexible mounting system. The mounting allows individual tank movement in upward and downward directions from a rest position. Close nesting is accomplished by provided adjacent tanks with complimentary curved ends. The tanks may have progressively increasing depths from the front to the rear of the trailer. Two sight gauges disposed on a diameter passing through a volumetric center line provides a means of assessing the quantity of liquid in the tank. Alternatively, a single gauge may be used in conjunction with a level meaning device on a horizontal line intersecting the volumetric center line and the gauge. A vapour recovery system includes two volumetrically matched members mounted within the tank equidistant from the volumetric center line one of which serves as a vent pipe.

29 Claims, 7 Drawing Sheets

U.S. PATENT DOCUMENTS

| | | | |
|---|---|---|---|
| 3,154,273 A | 10/1964 | Paulsen | 267/140.11 |
| 4,283,066 A | 8/1981 | Brown et al. | 280/838 |
| 4,325,560 A | 4/1982 | Hirvonen | 280/838 |
| 4,395,052 A | 7/1983 | Rash | 280/837 |
| 4,454,759 A | 6/1984 | Pirkle | 73/299 |
| 4,729,570 A | 3/1988 | Welch, Jr. | 280/837 |
| 5,263,824 A | 11/1993 | Waldbeser et al. | 417/10 |
| 5,404,903 A | 4/1995 | Anderson et al. | 137/514.3 |
| 5,636,665 A * | 6/1997 | Lie | 141/1 |

FOREIGN PATENT DOCUMENTS

| | | |
|---|---|---|
| EP | 0626298 A1 | 11/1994 |
| FR | 2532606 A1 * | 3/1984 |
| GB | 958486 | 5/1964 |
| GB | 1020948 | 2/1966 |

\* cited by examiner

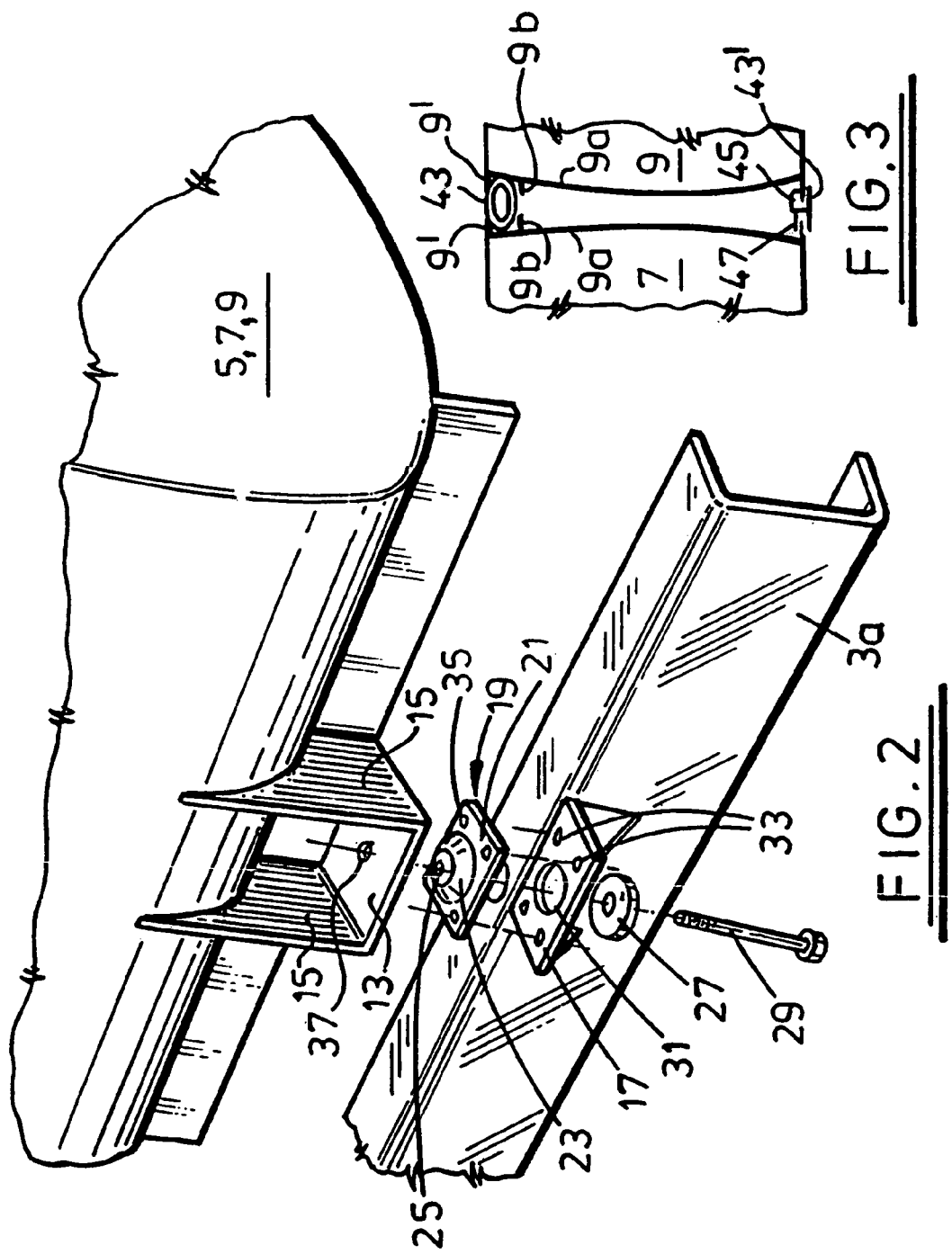

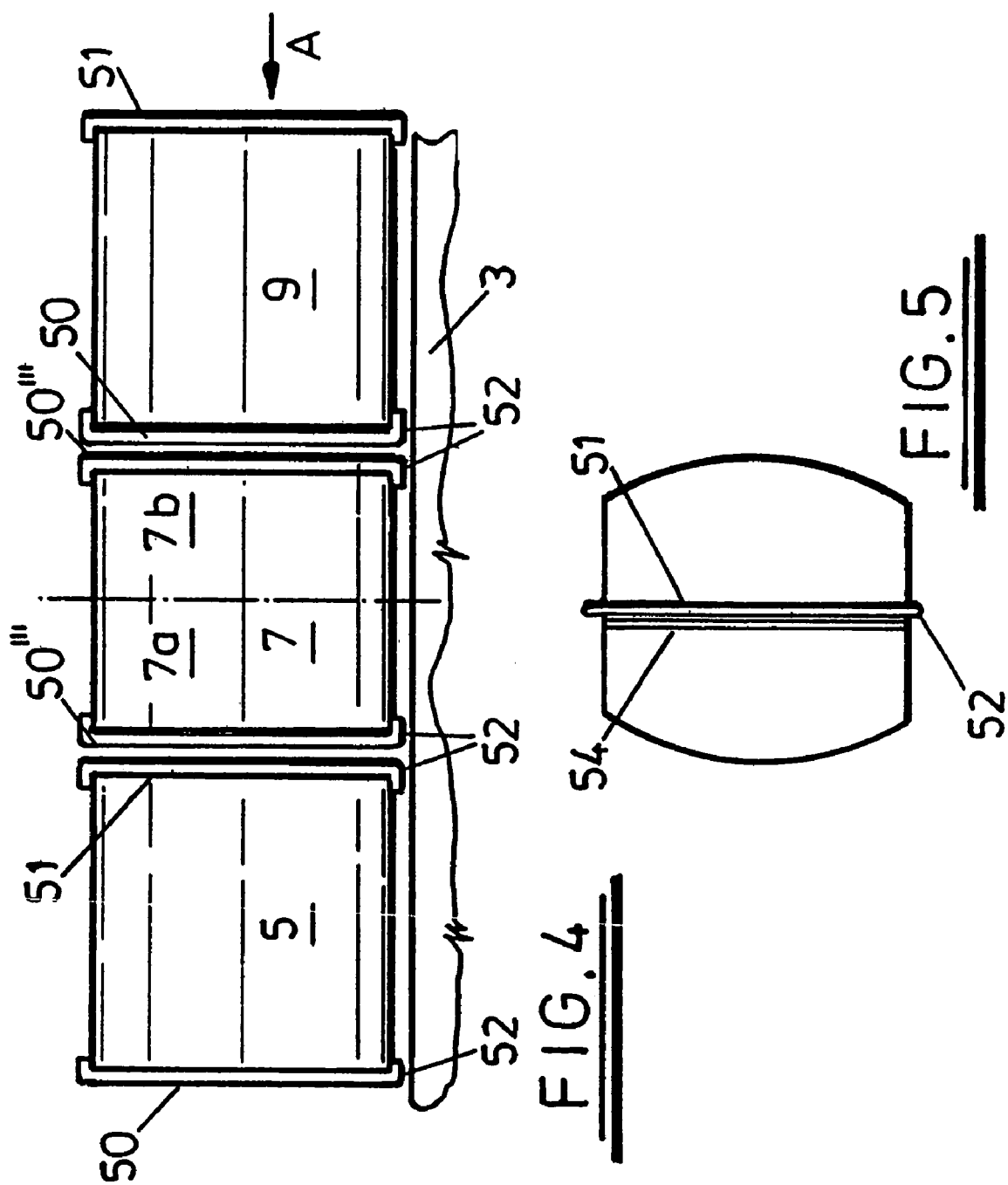

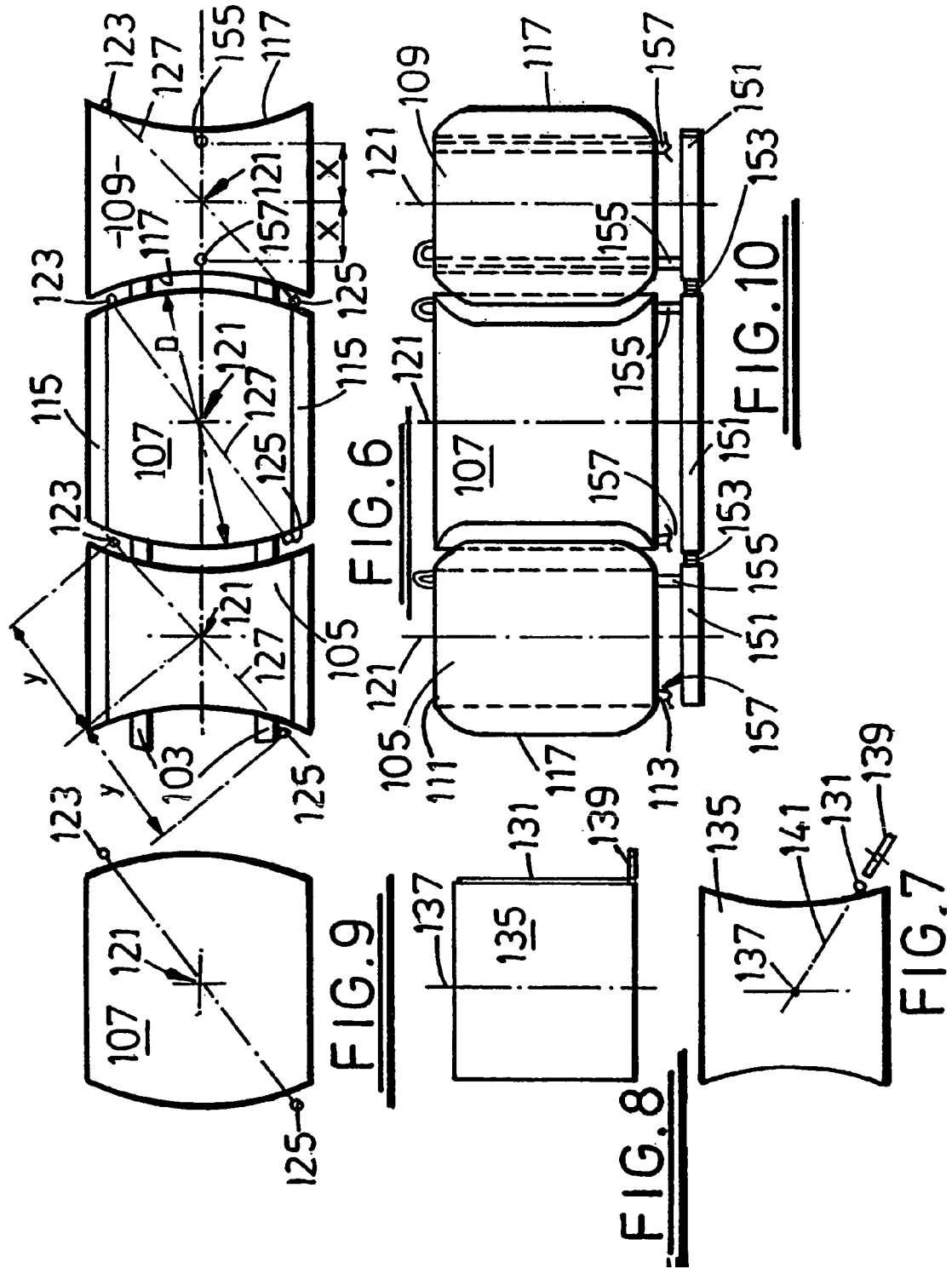

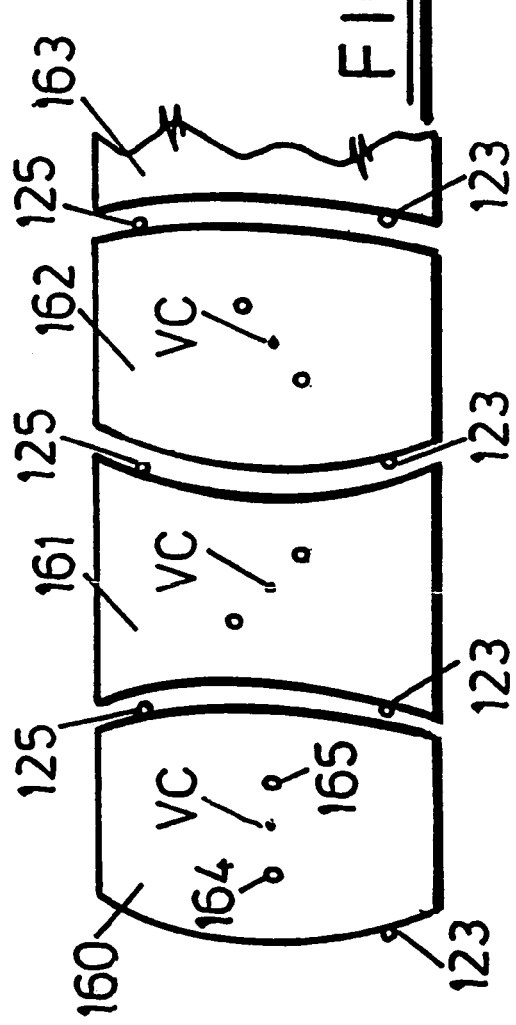
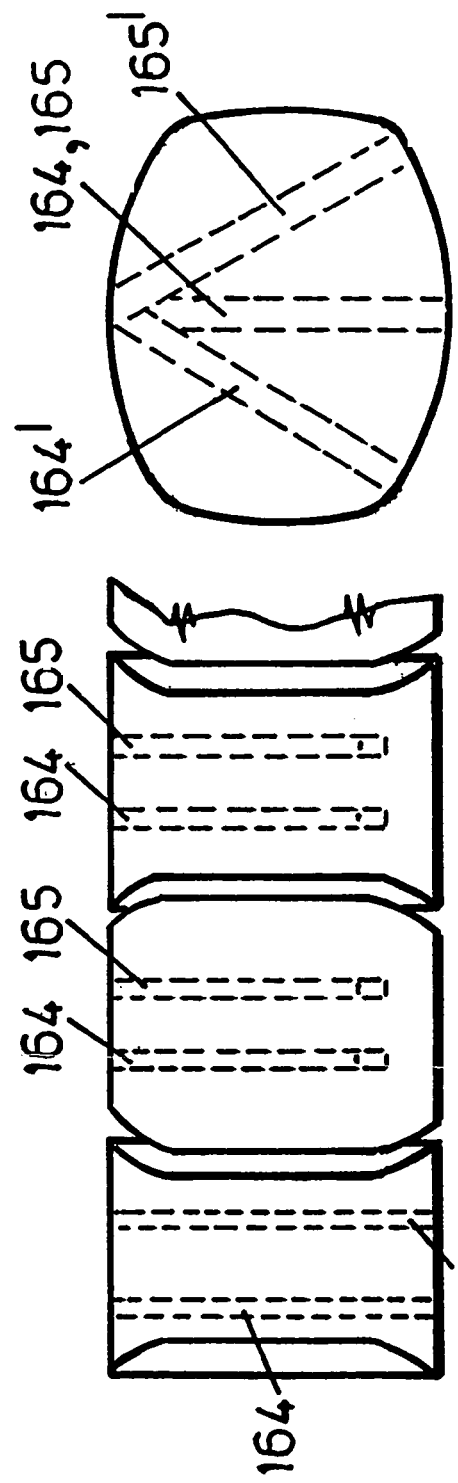

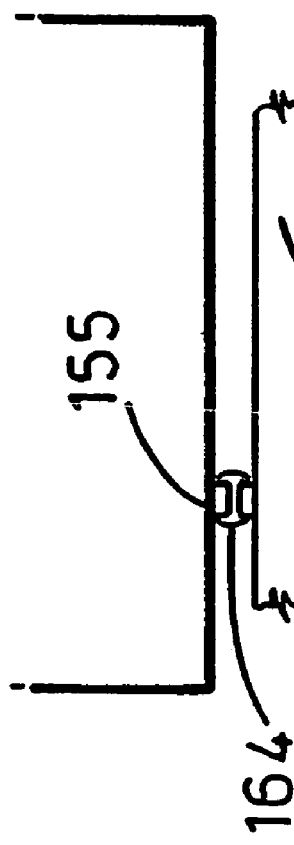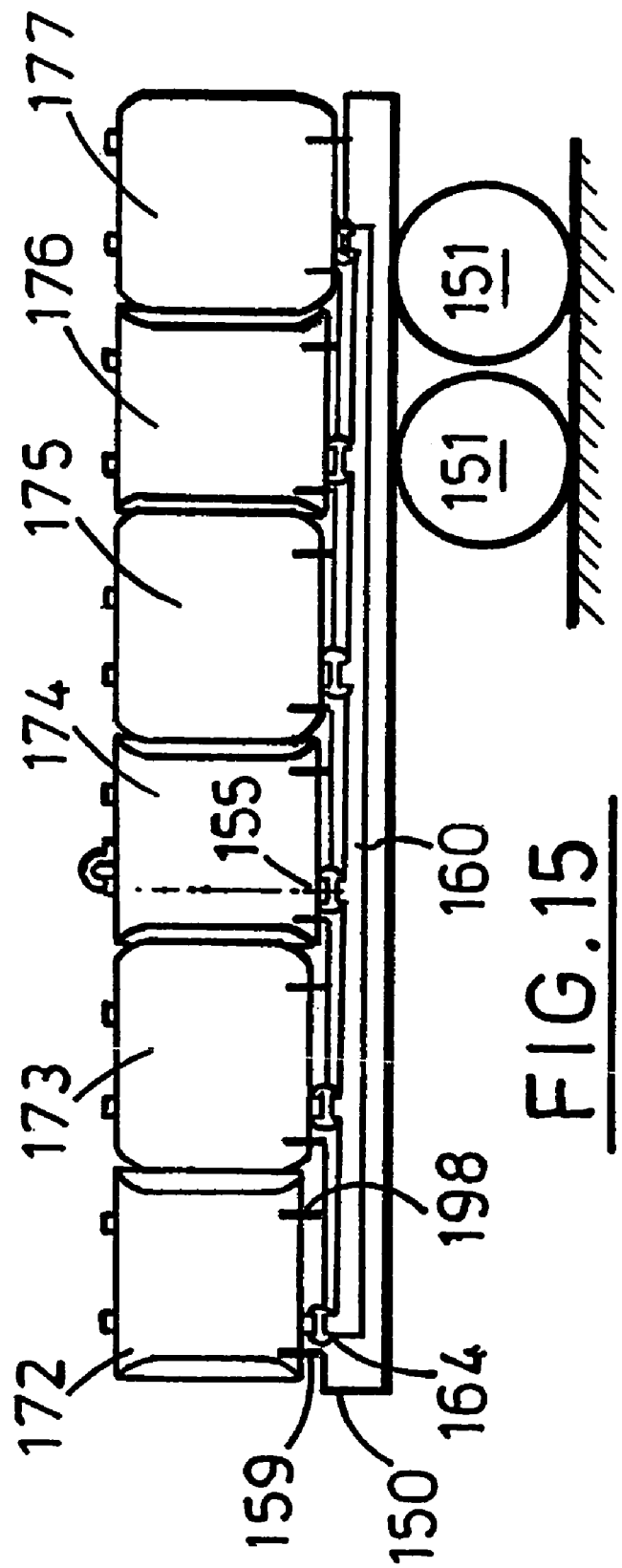

ROAD AND RAIL TANKERS

CROSS-REFERENCE TO RELATED APPLICATIONS

This is a continuation of application Ser. No. 10/390,285, filed Mar. 17, 2003 now U.S. Pat. No. 6,793,250, which was a continuation of application Ser. No. 09/699,720, filed Oct. 30, 2000 now U.S. Pat. No. 6,557,896.

The present invention relates to road and rail tankers.

Tankers are widely used for transporting liquids and in the case of road transportation, numerous designs of tank have been produced to suit so called rigid chassis vehicles which are self powered and semi trailers which are pulled by a tractor unit, and drawbar trailers The earliest designs comprised a single tank mounted on the chassis of a vehicle or trailer. Most tanks are formed with an integral longitudinal sub-chassis by which the tank is secured to the chassis of the vehicle or trailer. The typical vehicle chassis is of ladder construction and in practice is anything but rigid. Indeed it is intended to allow considerable flexing of the chassis, especially along its length, to accommodate variations in ground level.

When a tank is secured to a rigid vehicle chassis, the usual approach is to secure it positively using nuts and bolts connecting the chassis and the tank sub-chassis at several positions along its length. Usually a thin layer of rubber or felt is positioned between the respective chassis members to prevent rubbing due to metal to metal contact. This intermediate layer maybe of the order of 10 mm thick at most, often less, and offers little if any resilience.

As a consequence of the presence of the securely mounted tank the assembly is considerably stiffer than the chassis itself.

Most tanks are sub-divided into a series of separate compartments each with their own inlet and outlet. This enables different liquids to be carried. For example in the case of fuels or lubricants, different grades of fuels or lubricants can be carried in the one vehicle.

However, these multi-compartment tanks are known to suffer from cracking of one or more of the internal dividing walls, even the outer walls of the tank shell. This results in contamination of the contents of one compartment with those of another and/or leakage of the contents. This needs to be avoided The tanks have to be checked regularly to ensure integrity of each compartment. Gas pressurisation testing is the most reliable.

The cracking is believed to arise because of the repeated stressing of the tank due to the motion of the vehicle in use. Since the vehicle chassis or trailer chassis is less rigid than the tank any forces which cause twisting of the chassis will be transferred into the tank. However, the tanks are not able to resist these repeated twisting forces hence the above problem with cracking of the internal dividing walls and/or the external shell.

One attempt to try and solve this problem in the case of a rigid vehicle tank has been to mount the sub-chassis of the tank rigidly to the chassis of the vehicle at the rear of the chassis and to mount the other end of the tank chassis to the front of the vehicle chassis by way of over length bolts having coil springs applied about the shanks under the nuts to allow some movement of said end of the tank. This known arrangement allows approximately 25 mm of movement before coil binding but has not proved a solution to the problem. There is nothing against which the bolts can be tightened in this type of mounting.

It is believed that the flexing of a vehicle chassis or trailer can be in excess of 150 mm over the length of a typical chassis. Allowing for such a range of movement has not proved possible with the aforementioned proposals and consequently the problem of internal cracking remains.

The present invention aims to provide a solution.

Accordingly, a first aspect of the invention provides a road or rail tanker comprising a wheeled chassis and a plurality of tanks disposed in series one behind the other and wherein the plurality of tanks are individually mounted on the chassis each using a plurality of flexible mounts.

Each flexible mounting needs to allow at least upward and downward movement of the tank relative to a rest position so that twisting forces are not imparted directly to the tank. By using a plurality of tanks set along the length of the chassis, each tank mounting only has to be capable of accommodating a proportion of the total potential twisting movement of the chassis. A flexible mounting can be readily constructed to allow such amounts of movement while providing adequate support for the tank. The sort of mounting used for securing engines in the chassis of road vehicles can be readily adapted for this purpose. These allow movement in all directions relative to a rest position.

Each tank is able to move independently on its mountings and thereby accommodate the movement of the chassis at that location.

The tanks will be spaced apart in the longitudinal direction by an amount necessary to accommodate the permissible range of movement of each tank as the chassis twists and bends. As the movement of the chassis is not usually pure bending, but twisting, the tanks can be relatively close together than might otherwise be thought to be the case. The separation of the tanks is seen as aesthetically unpleasing and optionally the gap may be obscured by providing a continuity element. In one embodiment this is in the nature of a resilient plastic or rubber material, conveniently a length of flexible tube or piping, which at least extends down each side of the tanks at a position between the individual tanks. It is not necessary for the continuity element to be applied to the top or the base where it would not be visible to the casual observer. The gap between the tanks can provide a useful storage location for dip rods, air pipes, vents and wires. The continuity element may comprise a flat strip which is dimensioned to bridge the gap between the tanks and overlies the surface of the adjacent tanks. It may be secured to one of the tanks or be of a H-section to fit around respective end of flanges of the tanks. It may snap fit onto one of said flanges.

The preferred flexible mount comprises a resilient element made of rubber or the synthetic equivalent having a central bore receiving a metal sleeve. The resilient element is accommodated within a mounting flange to which it is secured by vulcanising, bonding or the like. The resilient element extends to both sides of the mounting flange. In use the mounting flange is interposed between flanges carried by the tank and the vehicle/trailer chassis such that a portion of the resilient element is under compression and a further portion projects through a hole in one of the flanges and is prevented from pulling through by a metal washer applied to the end thereof. A bolt passing through the assembly and carrying a nut to its other end secures the flexible mounting between the respective flanges of the chassis parts allowing relative movement of the tank with respect to the vehicle/trailer chassis. This construction allows the bolt to be fully tightened. It is preferred to provide at least 4 mountings for each tank. The number could be increased to carry heavier weights or individual mountings could be beefed up. Tanks that are at present made of steel to better withstand the imposition of bending and twisting forces could now be made of light alloys, such as aluminium. The reduction in weight will enable the tanks to be larger, thereby permitting increased quantities of liquid to be carried without increasing the overall vehicle/trailer gross weight.

The wheeled chassis may be a four, six or eight wheeled rigid self powered road vehicle, or a draw bar trailer, or an articulated semi-trailer for the road. There are advantages in the case of a semi trailer if the chassis, when connected to the tractor unit, can slope downwardly to the wheels of the trailer. For example it permits greater vertical articulation, i.e. downward movement of the trailer unit with respect to the trailer. However, such a construction when used with conventional multi-compartment tankers of the type where each compartment has to have a calibrated dip rod has problems as the inclination will result in a lack of horizontal symmetry and consequently the dip rod readings will be inclination dependent. However, this problem can be overcome when a plurality of separate tanks are used as each can be constructed so as to maintain symmetry and will have a volumetric centre line as discussed hereinafter. Accordingly it is proposed that the bottoms, and preferably also the tops, of the plurality of tanks are substantially horizontal when the trailer is connected to the tractor. Furthermore, it is proposed that the plurality of tanks disposed in line one after the other have an increasing depth in a direction from the front to the rear of the trailer. In practice this will result in the bottoms of adjacent tanks being relatively stepped in order to maintain horizontal symmetry of the tanks as discussed further hereinafter. It is preferred to mount each of the tanks using a plurality of flexible mounts in accordance with the earlier proposals. At least four mounts are provided. The forward mountings which connect the respective tanks to the chassis will be shorter than the rear flexible mountings in order to maintain the desired alignment.

It is a requirement of trading standards that each compartment of a tank has its own unique calibration chart and that each compartment is provided with a dip rod which is calibrated according to the respective calibration chart A tanker builder is required to provide facilities for dipping each tank and the dip rod has to be located at the volumetric centre of the tank. The volumetric centre, is the position in the tank at which the liquid therein never alters its height irrespective of the angle of inclination of the tank, at least within the limits of accuracy demanded by the trading standards. Tanks are generally constructed symmetrically such that this position when assessed in any horizontal plane defines a vertical axis. However, these dip tubes cannot be used for tanks containing petrol because the current regulations do not allow petrol vapour to enter the atmosphere. Most deliveries of petrol utilise a so called gravity drop which is not metered. Accordingly, there is currently no means for the quantity of petrol being delivered to be checked. The customer has to rely on unofficial metered readings of the quantity of fuel which has been loaded at the depot.

A solution is described herein When multiple tanks are used as proposed in the above-described aspect of the present invention, it becomes possible and practical to use a sight tube to determine the quantity of liquid in each compartment. Whilst each tank preferably comprises a single compartment, sight gauges may be used with multiple compartment tanks. If the outlet of the sight tube is disposed on the longitudinal centre line of the tank sideways inclination of the tank will unaffect the reading on the sight gauge.

If the tanker is standing level, as viewed longitudinally, when the reading is taken a single sight gauge will suffice. If it is out of level the reading will need to compensate for the degree of out of level. Means may be provided for measuring the angle of inclination and, a correction factor applied as appropriate for a particular tank.

Inclination in the longitudinal direction can be catered for by utilising two sight gauges for each tank, one at each end. The average of the opposite end readings will determine the quantity of liquid in the tank. The longitudinal inclination will usually be small such that averaging of the readings gives a sufficiently accurate value.

In the case of a multi-compartment tank the sight gauges are placed at any convenient end of the tank containing the multiple compartments and may be confined to a single sight gauge for each compartment. The compartments are numbered and the sight gauge for each compartment is identified by the same number.

The gauges are officially calibrated when the tank is level.

The sight gauges are vented back into the tank to avoid spillage as well as to avoid air locks and to prevent vapour entering the atmosphere. The location of the sight gauges between the tanks lessens the likelihood of damage. The end most sight gauges can be shielded to lessen the likelihood of damage. A valve is conveniently provided at or adjacent the connection of the sight gauge with the tank. This valve can be manually or remotely operable. It can be an air or electronically operated valve. Its operation nay be linked to operation of the tanker discharge valves or operated independently.

A second aspect of the invention provides apparatus for measuring the quantity of liquid in a road/rail transport tank comprising a pair of sight gauges centrally disposed at opposite ends of said tank and fed from a common or a respective outlet disposed on the longitudinal centre line of the tank, and a calibration for each sight gauge.

The sight gauges extend upwardly a sufficient distance to be able to show that the tank is full when the tank is longitudinally inclined taking into account the ullage. Preferably the upper end of the sight gauge is vented into the tank.

A third aspect of the invention provides a method of measuring the quantity of liquid in a road/rail transport tank utilising a pair of calibrated gauges as aforesaid, the method comprising averaging the readings of the two gauges.

The sight gauges branch from the tank and are vented back into the tank. Furthermore, the liquid in the sight gauge is the liquid contained in the tank.

The configuration of the tanks can give rise to problems with the accuracy of the readings with the second and third aspects of the invention and further aspects of the invention disclosed further hereinafter aim to address these problems.

In building mobile tankers for transporting liquids it is recognised that it is undesirable to utilise planar walls for the tanks because these are less able to withstand impact forces applied to them by movement of the liquid within or otherwise. As a consequence it is common for side walls to have a swept configuration (2D curvature) and for end walls to be either dished (3D curvature) or swept (2D curvature). Quite often the rear end wall and the front end wall are convexly curved (as viewed externally).

In deciding to split a large single compartment or multi-compartment tank into a series of separate tanks disposed in line one behind the other, I initially opted for each tank to have a concavely swept end and a convexly swept end. This is advantageous as it allows the nesting of adjacent tanks thereby reducing the dead space between the adjacent tanks whilst ensuring that each of the tanks benefit from the strength advantages of swept ends.

For most practical purposes each tank can be regarded as having opposite end walls, opposite side walls and top and bottom walls. More particularly, the opposite end walls will be curved for constructional reasons as mentioned above. Most usually the opposite side walls and the top and bottom walls will also be curved, and preferably, the tank shell will have a cross-section which is of so called max section, or which is elliptical or round (as viewed in vertical section).

Accordingly a fourth aspect of the invention provides a tanker comprising a plurality of tanks disposed in a line one behind the other, and wherein opposite end walls of each tank are curved and wherein the adjacent end walls of two adjacent tanks are complimentarily curved.

This aspect may be applied to any of the other aspects described herein.

In one embodiment the opposite end walls of each tank are correspondingly curved, whilst in another embodiment the opposite end walls of each tank are complimentarily curved.

However, in adopting my proposal for the use of sight gauges to measure the quantity of liquid in such tanks, problems can arise with the ability to position the sight gauges correctly in order to give the desired accuracy of the reading when the tank is off level. Thus, a configuration of tank is required that will allow close nesting of the plurality of tanks and that will allow convenient positioning of the sight gauges to give a sufficiently accurate reading. Another aspect of the invention aims to provide an advantageous solution.

Accordingly, where a pair of sight gauges are to be used to measure the quantity of liquid in the tank it is preferred that the ends of each tank are correspondingly curved. This ensures that the pair of sight gauges can each be positioned in close proximity to the respective ends of the tank in question and located on a diameter at equal distances from the volumetric centre line.

It is necessary in order to be able to measure the quantity of liquid in the tank sufficiently accurately to satisfy trading standards, that the tank, when viewed in any horizontal section has a vertical axis line which represents the volumetric centre of the tank. For convenience this axis is referred to as the volumetric centre line, and as mentioned above this should correspond to the position that the dip rod would be located. A tank having symmetry about this axis is referred to as an horizontally symmetric tank. With such a construction the reading from a pair of sight gauges placed on a diameter at equal distances on opposite sides of the volumetric centre line when averaged will give a sufficiently accurate reading to satisfy trading standards irrespective of any displacement of the tank from the horizontal. Currently trading standards seek an accuracy of 0.5% for the volumetric capacity reading. Accordingly, when we talk about a tank having horizontal symmetry, it only has to be symmetric to an extent to provide a sufficiently accurate reading to satisfy trading standard requirements. Furthermore, the range within which volumetric readings can be relied upon can be specified and need not require the whole of the tank from the bottom upwards to be volumetrically symmetric. Thus symmetry may start at a minimum volume thereby allowing the lower portion of the tank to be non-symmetric. The reference to horizontally symmetric as used herein is to be understood not to be limited to horizontal symmetry from the bottom of the tank but may be from any specified minimum volume for measurement purposes and may also accommodate variations from horizontal symmetry which produce a sufficiently accurate reading. The sight gauges can be disposed on any diameter, not merely on the longitudinal centre line of the tank. However, in order that the pair of sight gauges can be placed in close proximity to the opposite ends of the tank the opposite end walls of the tank will also lie at equal distances from the volumetric centre line when viewed on any horizontal diameter passing through that centre line.

Accordingly a fifth aspect of the invention provides a tank which is horizontally symmetric about a volumetric centre line, and which comprises a pair of sight gauges disposed parallel to said volumetric centre line and set at equal distances on a diameter centred on said volumetric centre line.

A sixth aspect of the invention provides a method of measuring the quantity of liquid in a tank which is horizontally symmetric about a volumetric centre line, and in which the tank further comprises a pair of calibrated sight gauges disposed parallel to said volumetric centre line and set at equal distances on a diameter centred on said volumetric centre line, in which method the readings from the pair of sight gauges are averaged to determine the quantity of liquid in the tank.

The sight gauges branch from the tank and are vented back into the tank. Furthermore, the liquid in the sight gauge is the liquid contained in the tank. A calibration is provided for each sight gauge.

It is a requirement that a vapour recovery system is provided for the tanks to avoid petrol vapour entering the atmosphere and another aspect of the invention aims to provide an advantageous vapour recovery system which in the case of a tanker comprising a plurality of flexibly mounted tanks allows movement of the tanks, and in the case of tanks that are horizontally symmetric does not compromise the readings from a sight gauge or gauges.

Accordingly a seventh aspect of the invention provides a vapour recovery system for a tank which is horizontally symmetric about a volumetric centre line, the tank further comprising a pair of members disposed within the tank substantially parallel to said volumetric centre line and set at equal distances on a diameter centred on said volumetric centre line, and in which one of the members serves as a vent pipe and emerges from the tank and communicates with a manifold which has provisions for connecting to a vapour recovery tank.

If the members are off vertical, any change to the symmetry is only small and in any event will give a more accurate reading than a single pipe. The other member comprises a matched pipe which may carry services such as air and/or electric services. Usually the members will be hollow members extending through the tank from the top to the bottom.

This aspect may be applied to any of the other aspects described herein.

In the case of a tanker comprising a plurality of tanks, especially flexibly mounted tanks as aforedescribed, the manifold may comprise a plurality of sections corresponding in number to the number of tanks and with each section connected by a flexible connection. In an alternative a single manifold is provided and the respective vent pipes connect with the manifold by way of a respective flexible joint. Preferably, the vent pipe emerges at or adjacent the bottom of the tank and extends through the tank to emerge at the top of the tank and to be connected back in to the top of the tank via a valve.

A single sight gauge can also give a sufficiently accurate reading in conjunction with a level measuring device which is set on a line extending between the sight gauge and the volumetric centre line when the level gives a level reading. Again the line can be on any diameter. This is particularly useful with multi-compartment tanks or where one of the pair of sight gauges cannot be used because its position would interfere with an adjacent tank.

Accordingly an eighth aspect of the invention provides a tank for liquid which comprises a sight gauge which branches from the tank and which is vented back in to the tank and further comprising a level measuring device.

A ninth aspect of the invention provides a method of measuring the quantity of liquid in a tank, the tank having a calibrated sight gauge and a level measuring device, the method comprising checking the level measuring device to check that the tank is level and reading off the quantity of liquid in the tank from the calibrated gauge In one embodiment the tank is horizontally symmetric about a volumetric centre line and the sight gauge is disposed parallel to said volumetric centre line and the level measuring device set on a horizontal diameter aligned with said volumetric centre line and said sight gauge. Accordingly the method comprises checking that the level reads level along said line. A simple linear bubble level may be used for the level measuring device. Any other means that would indicate the degree of level, such as a digital level gauge, may be used. In another embodiment which does not require the tank to be horizontally symmetric, the level measuring device is configured to be able to indicate when the tank and hence any liquid in the tank is level, i.e. horizontal. A bubble level may be used of the type that comprises a circular chamber. Alternatively a T level may be used or any other level measuring device which would have the same effect The various aspects of the invention will now be described further by way of example only with reference to the accompanying drawings in which:—

FIG. 1 is a side view of a road tanker according to one embodiment of the invention, FIG. 2 is an exploded fragmentary perspective view of one embodiment of mounting used in the invention, FIG. 3 is a section on 3—3 showing one embodiment of continuity strip, FIG. 4 is a schematic side view of three tanks embodying a further feature of the invention, FIG. 5 is an end view in the direction of arrow A of FIG. 4

FIG. 6 is a schematic plan view of a tanker having a plurality of tanks configured according to one or more aspects of the present invention and showing one tank in horizontal section, FIG. 7 is a schematic plan view of one embodiment of tank provided with sight gauges according to another aspect of the invention, FIG. 8 is a schematic side view of the tank of FIG. 7, FIG. 9 is a schematic plan view of a tank provided with a sight gauge according to yet another aspect of the present invention, FIG. 10 is a broken away side view of the tanker of FIG. 6 showing the tanker venting system according to another aspect of the invention, FIG. 11 is a cut away schematic plan view of a plurality of tanks according to an alternative embodiment and showing alternative positions for the symmetrical venting system.

FIG. 11a is a side view of the nested tank configuration of FIG. 11 and illustrating alternative venting arrangements.

FIG. 14 is a typical tank cross section as viewed in vertical section,

FIG. 15 is a side view of a semi trailer embodying various aspects of the invention, and FIG. 16 is a fragmentary side view of one of the tanks shown in FIG. 15 showing an alternative vent connection.

Figure 1:
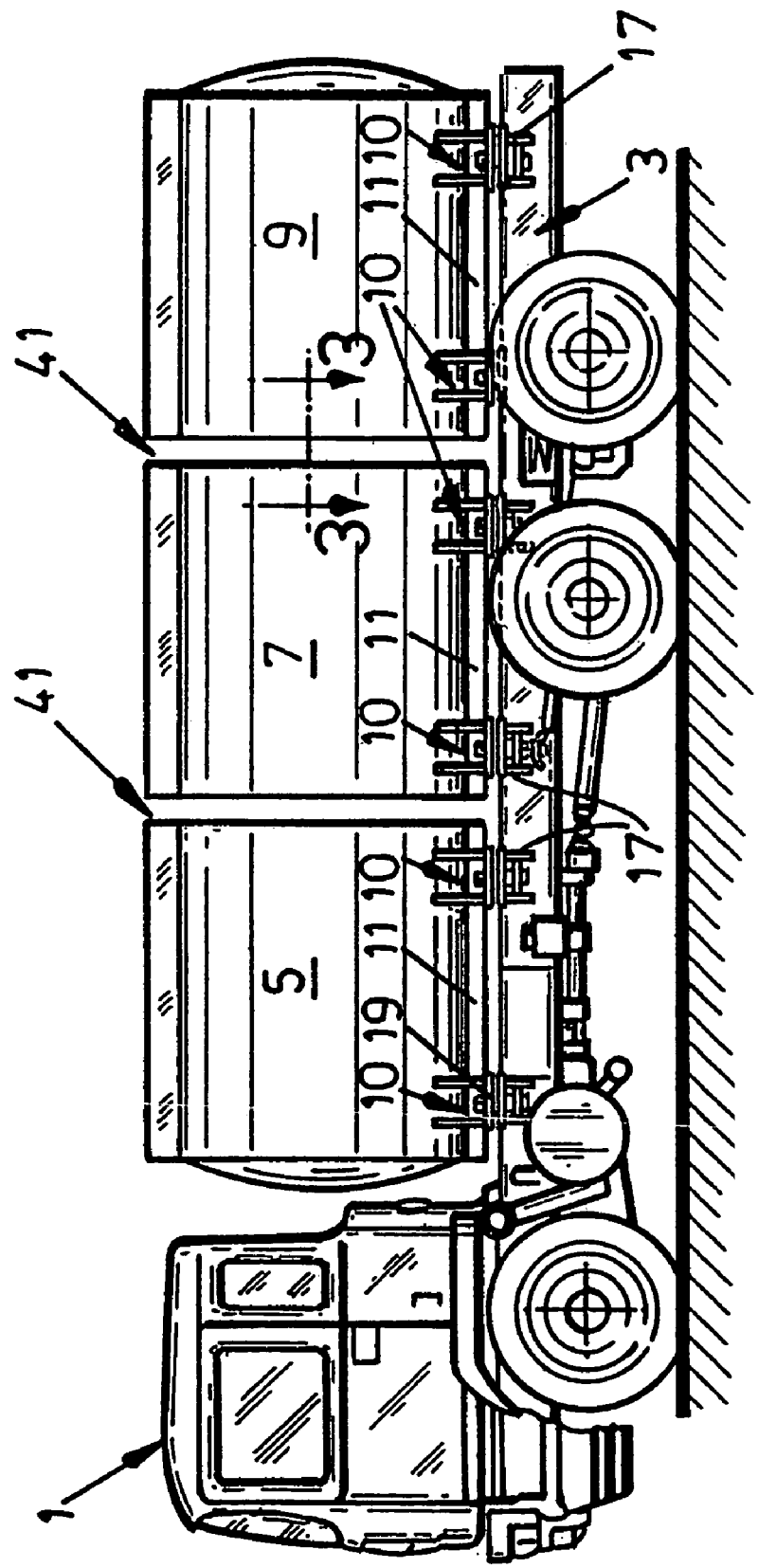

Referring now to the drawings, one aspect of the present invention is illustrated with reference to a six-wheeler rigid vehicle whose cab is shown at 1 and chassis at 3. The chassis comprises a typical ladder frame chassis having longitudinals made up of two parallel longitudinally extending C-section channel members 3a interconnected by transverse members not shown. In the illustrated embodiment three tanks 5, 7 and 9 are shown mounted onto the vehicle chassis. The tanks are of any convenient construction and any suitable material appropriate to the materials to be carried, e.g. steel, stainless steel or alloy to accommodate the liquid to be transported and provided with appropriate filling ports and outlet valves not illustrated. The outlet valves are flexible mounted with respect to the vehicle/trailer chassis to accommodate movement of the tank. In the illustration each tank is provided on each side with two tank mounting flanges 13 secured with respect to the tank byway of fillets 15. The mountings are shown generally at 10 in FIG. 1 and one is illustrated in greater detail with reference to FIG. 2. The chassis 3 rails are provided with chassis mounting flanges 17 and the respective tank and chassis flanges are connected by a resilient mounting element 19. The resilient mounting element comprises a mounting flange 21 to which is bonded a resilient element 23 to project to both sides of the flange 21. The resilient element has a bore in which is received a sleeve 25. Flange 17 mounted to the vehicle chassis has an aperture 31 to receive the downwardly projecting cylindrical portion, the resilient mounting 23 and holes 33 to align with holes 35 in the mounting flange 21 of the resilient element. A washer 27 which is larger than hole 31 is placed on the end of the resilient element which projects below the flange 17 and a shank of bolt 29 passes trough the washer 27, the bore 25 and a hole 37 in the flange of the tank to receive a nut in the assembled position as shown generally in FIG. 1. Part of the resilient element is trapped between the respective flanges 13, 17 whilst upward movement is allowed by compression of the cylindrical portion of the element which extends below the flange 17. Thus it will be seen that the provision of such resilient mountings for each tank allows each tank to move and absorb flexing of the chassis 3 without imparting stresses to the tank itself. The number of flexible mounting is chosen to suit the gross weight of each tank The tanks 5, 7, 9 may be single compartment tanks or multiple compartment tanks since resilient mounting removes the stressing of the tanks and eliminates any likelihood of any cracking of any tank divisions. It will be appreciated that by using multiple tanks disposed one behind the other in series along the length of the chassis, each tank only has to accommodate a proportion of the potential total twisting movement of the chassis. It will be apparent that each flexibly mounted tank can move in all directions relative to a rest position.

FIG. 3 illustrates how the gaps 41 shown between the tanks in FIG. 1 can be camouflaged by introducing a resilient tubular element 43 into a channel formed down each side of the tank. This can be conveniently formed by extending the side-walling of the tank 7', 9' beyond the domed end walls 7a, 9a and adding retaining strips 7b, 9b to the end walls to form a channel at the edge of each tank extending from the top to bottom thereof. In an alternative, a strip-like element 43' has a groove 45 for gripping one of the tank flanges and another groove 47 which receives the other tank flange slidably there between.

We have found that a resilient mounting which allows approximately 50 mm of movement is satisfactory with a chassis having a length of 5.5 m.

Typical sizes of vehicle are:—
1. Articulated semi trailers—35,600 to 46000 ls Comprising five, six or seven compartments.
2. An eight wheeled rigid—25,000 ls comprising five or six compartments.
3. A six wheeled rigid—20,000 ls Comprising four or five compartments.
4. A four wheeled rigid—13,000 ls comprising four or five compartments.
5. A draw bar trailer—20,000 ls comprising three or four compartments.

Referring now to FIGS. 4 and 5. The tanks 5, 7, 9 of FIG. 1 are shown schematically in FIG. 4. The connection with the chassis 3 is omitted. Tanks 5 and 9 are illustrated as single compartment tanks. Each compartment has a pair of sight gauges 50, 51—comprising a transparent tube—disposed at opposite ends of the respective tanks 5 and 9. In the illustration the tubes emerge from the bottom of a tank. Each connection with the tank is disposed on the longitudinal centre line of the tank and preferably feeds by way of a respective cut off valve 52, shown as an X. These may be manually or remotely actuated valves. Preferably they operate automatically when the tanker is stationary for loading and unloading purposes. The tubes extend vertically upwardly on the longitudinal centre line—as shown in FIG. 5 (or as close as possible in the case of multiple compartment tanks) and their upper ends are returned into the tank. The tubes are set so that they are the same distance from the centre of the tank as viewed in the longitudinal direction. A single sight gauge could be used with these tanks as an alternative where angle compensation means is provided as described further hereinafter. The tank 7 is shown as a multi-compartment tank and the two 7a, 7b compartments are shown with a respective single sight gauge 50''', which will suffice where angle compensation is provided.

A calibrated gauge 54 is provided adjacent each sight tube. It is calibrated in the same way as a conventional dip rod and each sight gauge will have its own unique calibration chart In the case of pairs of gauges, the sight gauges at each end are calibrated simultaneously by filling the tank whilst on level ground with discrete measured quantities of liquid and marking the gauge as each discrete quantity is input. By this means the reading on the gauges provides a true measure of the quantity of liquid in the tank—when level. When the tank is inclined from the horizontal in the longitudinal direction, the average of the readings on the two gauges is used as a measure of the quantity of liquid in the tank, for the case of the single compartment tanks 5, 9 where the upwardly extending tubes 50, 51 are positioned at substantially equal distances from the centre of the respective tanks, and is sufficiently accurate for most purposes. By this means, the need for separate dip tubes is avoided, as is the need for more elaborate pneumatic/electronic dip gauges. Where a single sight gauge is used for each tank or compartment, an angle measuring device (not shown) is provided to determine the degree of inclination in the longitudinal direction, and this is used with a look up table which tells the operator the compensation factor that is to be applied for any particular inclination. The compensation factor is unique for each tank and is established by inclining the tank in say degree increments and noting the change in the level reading. Because the sight gauge is vertical and hence a constant distance from the rotational pivot centre of the tank contents, the noted distance will be the same irrespective of the quantity of liquid in the tank. Of course the distance may equate to different quantities at different levels if the tank is not uniform in vertical cross-section, but this will be allowed for by the calibration in the gauge which takes account of horizontal cross-sectional variations. Thus, the compensated reading will give a sufficiently accurate measure of the quantity of liquid in the tank.

When the tank is being loaded the valves to the sight tubes are opened. Similarly when the contents of the tank are being unloaded, the valves are open. At all other times the valves can be closed. In the event of damage to the sight gauges in transit losses are minimised. Where the valving operates to open automatically on loading/unloading, an override facility may be provided to isolate damaged sight tubes. The provision of sight gauges is particularly useful for determining the quantity of liquid in each compartment and for the likes of forecourt gravity drops (i.e. where the output is not metered), where they can be used as a check on quantity delivered.

The adjacent tanks of FIG. 3 are both portrayed as having convexly curved swept ends. However, by having the adjacent ends complimentarily curved rather than correspondingly curved the dead space between the adjacent tanks to be reduced. Such an arrangement is illustrated in FIG. 6 and also in FIGS. 11, 11a, 12 and 13.

FIG. 6 shows three tanks 105, 107, 109 which are mounted, preferably using a flexible mounting system substantially as described above, on a chassis 103 in line one behind the other. Each tank has top and bottom walls 111,113 (see FIG. 10) a pair of opposite swept side walls 115 and a pair of opposite swept end walls 117. FIG. 14 illustrates a typical cross section for the tanks described herein. The end walls of tank 107 are convexly curved whilst the end walls of tanks 105 and 109 are concavely curved I.e. the opposite end walls of each tank are correspondingly curved whilst the adjacent ends of the adjacent tanks are complimentarily curved. More particularly, if a tank is viewed on any horizontal section, the walls of the tank are disposed at equal distances on a diameter, e.g. D, from a vertical centre line 121. Such a centre line is referred to herein as the volumetric centre line and such a tank is referred to as an horizontally symmetrical tank. With an horizontally symmetrical tank as illustrated in FIG. 9, the averaged readings taken from two vertical sight gauges 123, 125 disposed on a diameter 127 centred on the volumetric centre line 121 will give a sufficiently accurate reading of the quantity of liquid in the tank irrespective of the angle of inclination of the tank, at least within the range of inclinations that might reasonably be expected to occur in practice.

Figures 12, 13:
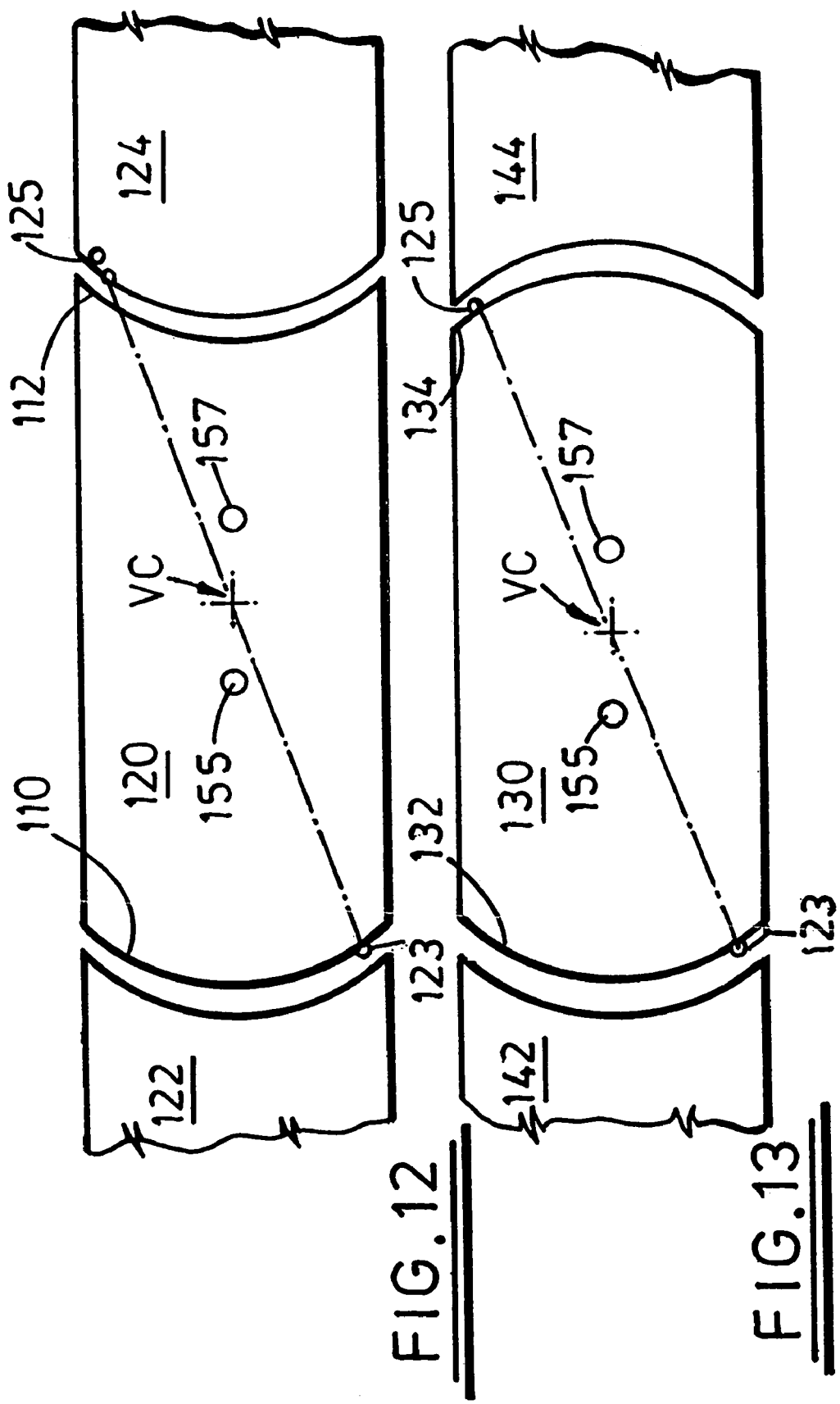
FIGS. 12 and 13 are fragmentary plan views showing alternative tank end wall configurations.

In FIG. 12 the opposite ends 110, 112 of the tank 120 are complimentarily curved, i.e. end 110 is convex whilst end 112 is concave. The adjacent ends of the adjacent tanks 122, 124 are complimentarily curved in order to allow the adjacent tanks to be closely spaced. In FIG. 13 the opposite ends 132, 134 of the tank 130 are complimentarily curved. This is also the case for the adjacent tanks 142, 144. Both ends 132 and 134 are convex, whilst both ends of the adjacent tanks are concavely curved. The adjacent ends of the adjacent tanks 142, 144 are complimentarily curved in order to allow the adjacent tanks to be closely spaced. FIG. 12 illustrates how the positioning of the pair of sight gauges 123, 125 at equal distances on a common diameter centred on the volumetric centre VC is compromised by the position of the adjacent tank when the tanks have complimentary opposite ends. By contrast, FIG. 13 illustrates how the use of tanks having correspondingly curved ends allows the sight gauges 123, 125 to be positioned as desired at equal distances from the volumetric centre line whilst allowing the sight gauges to be positioned close to the ends of the tank. In both illustrations the vent pipe and the matching pipe are shown at 155, 157.

In an alternative illustrated in FIGS. 7 and 8, an horizontally symmetrical tank 135 having a volumetric centre line 137 is provided with a single vertical sight gauge 131 and a level measuring device 139 (conveniently a linear bubble level). The bubble level is set on a line 141 extending perpendicular to the volumetric centre line and which intersects the volumetric centre line and the axis of the sight gauge 131. With such an arrangement the reading on a calibration along side the sight gauge 131 will give a true reading of the quantity of liquid in the tank when the bubble indicates the line 141 to be level. It is assumed that the sight gauge is calibrated when the tank is level.

For a tank which is not horizontally symmetric the level measuring device will need to be able to show that the tank is horizontal in all directions, not just on the aforesaid line. Two linear bubble levels set at 90° to one another may be used or a bubble level or any other level measuring device may be used which will give an equivalent reading.

It is usual to provide tanks with a vapour recovery system. The existing designs provide a port in the top of each tank which opens into a manifold which has a connection at one end which can be communicated with a tank at the loading station or with a tank at the delivery station as the case may be to ensure that any vapour in the system is returned to one of those tanks and not released into atmosphere. When individual flexibly mounted tanks are employed as described above, the manifold has to allow for this movement and accordingly the manifold is split into a number of sections 151—see FIG. 10—corresponding to the number of tanks and a flexible connection 153 is provided between each of those sections. However if the manifolds are provided at the top of the tanks as is the ease with existing designs of multi-compartment tanks, the flexible coupling would have to accommodate a large amount of movement because the manifold is located the greatest possible distance from the tank mountings. This is avoided according to another aspect of the invention by disposing the manifold closer to the region of the mountings. However, if the ports were tapped off the top of the tanks it would be necessary to have pipes extending down the outside of the tanks which would be unsightly and where they could be exposed to damage or if positioned between the tanks adversely affect the close spacing of the tanks. This is avoided by providing a vent pipe 155 within the tank which emerges from the tank either at the bottom or at a position adjacent the bottom and preferably close to the horizontal position of the tank mountings. The vent pipe extends through and out of the top of the tank and is connected back into the tank by way of a valve which allows vapour in the tank to be pass to the manifold. However, if only a single vent pipe is used for each tank, it would adversely affect the reading of any sight gauge. This problem is avoided by providing two pipes 155, 157 in each tank and by disposing those pipes on a diameter at equal distances x on opposite sides of the volumetric centre line of the tank as illustrated in FIGS. 6 and 10. Both pipes may be vent pipes but for practical purposes one pipe 155 serves as a vent pipe whilst the other pipe 157 serves as a convenient means of running services, such as electric wires or pneumatic lines from the top to the bottom of the tanks.

FIGS. 11 and 11a illustrate tank nesting using tanks having correspondingly curved ends and the end walls of adjacent tanks are complementarily curved. Thus the tank 160 has convex ends, tank 161 has concave ends and, tank 102 has convex ends and tank 163 has concave ends. All tanks have a volumetric centre VC and are shown with pairs of sight gauges 123, 125. The matched members serving as the vent and service pipes 164, 165 are shown. Those in tank 160 are vertical and on the longitudinal centre line. Those in tank 161 are set on a diameter offset from the longitudinal, as are those in tank 162 and as a consequence, will emerge from the tank disposed slightly from the bottom even if vertical. FIG. 14 shows how the pipes 164, 165 may be splayed. This is advantageous to displace the lower exit point from the region of the vehicle chassis and any outlet pipes from the tanks.

FIG. 16 illustrates an alternative arrangement by which each vent pipe from the respective tanks can be connected with a vent manifold. In this embodiment a one piece manifold 160 is provided which runs along the length of the tanker. Each vent tube 155 which emerges from the tank is connected to the manifold by a flexible connection 164.

FIG. 15 describes how various aspects described herein can be applied to a semi trailer. The trailer comprises a chassis 150 having wheels 151 and on which chassis is mounted six tanks 172–177. Each of the tanks is flexibly mounted on the chassis using flexible mounts of the type described above. There are at least four mounts for each tank Two placed forwardly on opposite sides of the tank and two placed rearwardly on opposite sided of the tank. When hitched the trailer chassis will be slightly inclined (say 1 in 40) and to compensate for this and to ensure that the tanks 172–177 are horizontal when the trailer is connected, the tank mounted flanges for the rearward mounts 178 (shown schematically) are longer than the forward mounts 159. The mounting plane for each set of mounts may be parallel with the chassis or as an alternative may be horizontal in use. In the latter case, adjacent sets of flanges will lie in stepped horizontal planes. The mountings are conveniently as described with reference to FIG. 2. The tanks are of increasing depth from front to rear and as a consequence will have different capacities. The tops of all the tanks are aligned substantially horizontally (as near as possible) when the trailer is hitched. The tanks are of nested configuration as described above and preferably have correspondingly curved opposite ends such as has been described with reference to FIG. 6, 10, 11, or 13. The tanks are preferably provided with pairs of sight gauges as described above with reference to FIG. 6 or 13. A vapour recovery system is provided which follows the above teaching of providing volumetric symmetry. The vent pipes connect with a one piece manifold such as described with reference to FIG. 16.

It will be appreciated that the bottoms of the tanks need not be horizontal where the tanks are calibrated on the understanding that the readings are only correct above a minimum volume which takes into account any lack of symmetry of the lower portion of the tank.

What is claimed is:

1. A tanker comprising a wheeled chassis and a plurality of tanks, the tanks being disposed in a line one behind the other and mounted with respect to the chassis, each tank having opposite end walls and the opposite end walls of each tank being curved, and wherein the opposite end walls of each tank are correspondingly curved whilst the adjacent ends of adjacent tanks are complimentarily curved.

2. A tanker as claimed in claim 1 in which each tank is horizontally symmetrical and has a volumetric centre line.

3. A tanker as claimed in claim 1 in which the curved ends of the tank are concavely curved or convexly curved.

4. A tanker comprising a wheeled chassis and a plurality of tanks, the tanks being disposed in a line one behind the other and mounted with respect to the chassis, each tank having opposite end walls and the opposite end walls of each tank being curved, wherein the opposite end walls of each tank are correspondingly curved with respect to those of an adjacent tank, in which each tank is individually mounted to the chassis using a plurality of flexible mounts and wherein each flexible mount comprises a resilient element having a central core accommodating a sleeve, and wherein the resilient element is accommodated within a mounting flange which is secured with respect to one of the chassis and tank, and a securing means cooperating with the sleeve to secure same with respect to the other of the chassis and tank to provide a resilient connection between same.

5. A tanker as claimed in claim 4 in which a retaining washer is secured with respect to the sleeve by said securing means and is dimensioned to act as an end stop and to retain the mounting in place in the event of failure of the resilient element.

6. A tanker as claimed in claim 1 in which the wheeled chassis is an articulated semi-trailer for the road.

7. A tanker as claimed in claim 6 in which, in use, the chassis is inclined and each of the tanks has an increasing depth from the front to the rear of the tanker.

8. A tanker as claimed in claim 7 in which the top of the tanks are in alignment and substantially horizontal in use.

9. A tanker as claimed in claim 7 in which the tank bottoms are substantially horizontal, in use, and the bottoms of at least two adjacent tanks are stepped relative to one another.

10. A tanker as claimed in claim 4 in which each tank has forward and rearward mounts on the chassis, and in which the forward and rearward mounts for each tank are arranged to lie in a substantially horizontal plane in use.

11. A tanker as claimed in claim 10 in which the mounts for adjacent tanks lie in different horizontal planes.

12. A tanker as claimed in claim 1 in which the wheeled chassis is a four, six or eight wheeled rigid self-powered road vehicle.

13. A tanker as claimed in claim 1 in which the chassis is that of draw bar trailer.

14. A tanker as claimed in claim 2 in which each tank has an outlet valve and the outlet valve is resiliently mounted with respect to the wheeled chassis and the tank.

15. A tanker as claimed in claim 1 when constructed as a rail vehicle.

16. A road tanker having at least one tank which is symmetric about a volumetric centre line, and which comprises a pair of sight gauges disposed parallel to said volumetric centre line and set at equal distances on a diameter centred on said volumetric centre line, and a calibration for each sight gauge to determine the quantity of liquid in the tank, and wherein the sight gauges branch from the tank and are vented back into the tank, and in which the liquid in the sight gauge is the liquid in the tank.

17. A tank as claimed in claim 16 in which the pair of sight gauges are centrally disposed at an end of the tank and fed from a common or a respective outlet of the tank, which outlet is disposed on the longitudinal centre line of the tank.

18. A road tanker comprising a wheeled chassis and a plurality of tanks disposed in a line one behind the other and individually mounted on the chassis, and wherein at least one tank is symmetric about a volumetric centre line, and which comprises a pair of sight gauges disposed parallel to said volumetric centre line and set at equal distances on a diameter centred on said volumetric centre line, and a calibration for each sight gauge to determine the quantity of liquid in the tank, and wherein the sight gauges branch from the tank and are vented back into the tank, and in which the liquid in the sight gauge is the liquid in the tank.

19. A tanker as claimed in claim 16 in which at least one tank is individually mounted to the chassis using a plurality of flexible mounts that allow movement in at least an upward and downward direction relative to a rest position.

20. A tanker as claimed in claim 19 in which the mounts allow movement in all directions relative to a rest position.

21. A tanker as claimed in claim 18, wherein the opposite end walls of each tank are curved and wherein the opposite end walls of an adjacent tank are complimentarily curved to those of the adjacent tank.

22. A tanker as claimed in claim 20 in which the at least one tank is a horizontally symmetric tank.

23. A tanker as claimed in claim 18 in which the at least one tank is a horizontally symmetric tank.

24. A tanker as claimed in claim 16 in which the wheeled chassis is an articulated semi-trailer for the road.

25. A tanker as claimed in claim 16 in which the wheeled chassis is a four, six or eight wheeled rigid self powered vehicle.

26. A tanker as claimed in claim 16 in which the wheeled chassis is a drawbar trailer.

27. A tanker as claimed in claim 16 in which, in use, the chassis is inclined and each of the tanks has an increasing depth from the front to the rear of the tanker.

28. A tanker as claimed in claim 16 in which the tops of the respective tanks are in alignment and substantially horizontal, in use.

29. A tanker as claimed in claim 16 in which the tank bottoms are substantially horizontal in use and the bottoms of at least two adjacent tanks are stepped relative to one another.

* * * * *